No. 747,412. PATENTED DEC. 22, 1903.
A. H. GETZ.
HOSE COUPLING.
APPLICATION FILED OCT. 24, 1903.

NO MODEL.

WITNESSES:
T. E. Turpin
N. C. Healy

INVENTOR
August H. Getz.
BY James J. Sheehy
Attorney

No. 747,412. Patented December 22, 1903.

UNITED STATES PATENT OFFICE.

AUGUST HENRY GETZ, OF WASHINGTON, DISTRICT OF COLUMBIA.

HOSE-COUPLING.

SPECIFICATION forming part of Letters Patent No. 747,412, dated December 22, 1903.

Application filed October 24, 1903. Serial No. 178,345. (No model.)

*To all whom it may concern:*

Be it known that I, AUGUST HENRY GETZ, a citizen of the United States, residing at Washington, in the District of Columbia, have invented new and useful Improvements in Hose-Couplings, of which the following is a specification.

My invention pertains to hose-couplings; and it has for its object to provide a hose-coupling the members of which are adapted to be connected by a simple rectilinear movement of one or both, and this through the medium of simple and sturdy mechanism which is not exposed to the water passing through the coupling, and is therefore not liable to be set by freezing or deteriorated by corrosion.

With the foregoing in mind the invention will be fully understood from the following description and claims when taken in connection with the accompanying drawings, forming part of this specification, in which—

Figure 1:
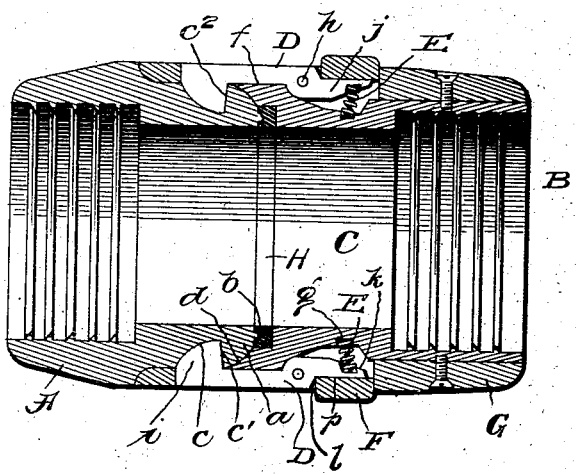
Figure 2:
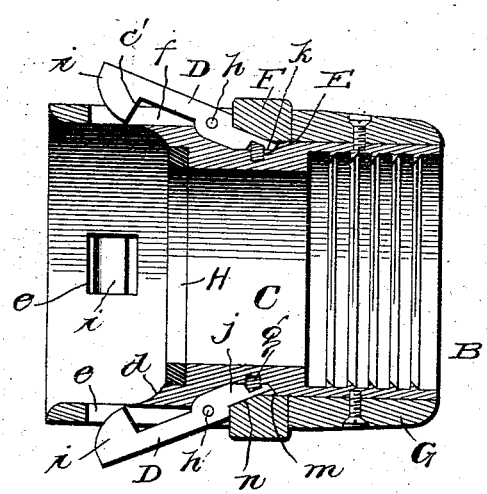
Figure 3:
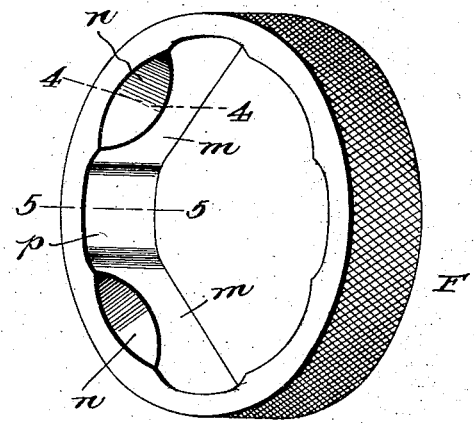
Figure 4:
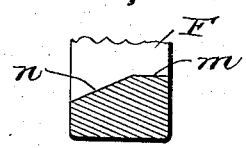
Figure 5:
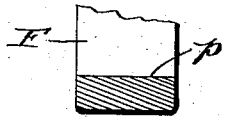

Figure 1 is a longitudinal diametrical section of the coupling constituting the preferred embodiment of my invention with the members thereof connected; Fig. 2, a view of the female member of the coupling as the same appears when its latch-levers are in position to release the male member; Fig. 3, a perspective view of the latch-operating annulus of the female member removed; and Figs. 4 and 5, transverse sections of the same taken in the planes indicated by the lines 4 4 and 5 5, respectively, of Fig. 3.

Similar letters designate corresponding parts in all of the several views of the drawings, referring to which—

A is the male member, and B the female member, of my novel coupling, both of which are preferably circular in cross-section. The male member is cast or otherwise formed of suitable material, preferably metal, and may be connected to a hose or other pipe or fixed to a plug or other source of water-supply in any approved manner without involving a departure from the scope of my invention. It is provided at its outer end with a beveled, preferably convex, head $a$, bearing an annular projection $b$, and is also provided at the inner side of said head with a circumferential groove $c$. The outer wall of this groove is by preference slightly inclined outwardly, and its bottom wall, which extends to the perimeter of the member, concave, as illustrated.

The female member, like the male member, is preferably of metal and of circular form in cross-section and may be connected to a hose or any source of water-supply in any approved manner. Said female member comprises a tubular body C, four (more or less) latch-levers D, springs E for normally holding said levers in the position shown in Fig. 1, an annulus F for operating the levers, and a collar G for retaining said annulus in position. The tubular body C is provided at about the distance shown from its outer end with an interior beveled abutment $d$, corresponding to the head $a$ of member A, and it is also provided in the wall of its outer portion with four (more or less) radially-disposed apertures $e$ and in its outer side with four (more or less) longitudinal recesses $f$. These latter communicate with and extend inwardly from the apertures $e$ and are provided in the bottoms of their inner portions with sockets $g$, designed to seat the inner ends of the springs E. The latch-levers D are fulcrumed at $h$ in the recesses $f$ and have beveled heads $i$ at their outer ends, disposed in the apertures $e$ of the body, and also have inner arms $j$, the ends of which are beveled at their inner sides, as indicated by $k$. Between the said arms $j$ of the latch-levers and the body C the springs E are interposed, and hence it will be seen that the springs will operate to return the latch-levers to and normally hold them under pressure in the position shown in Fig. 1. It will also be noticed that when the latch-levers are swung into the position shown in Fig. 2 their bevels $k$ will bring up against the bottoms of the recesses $f$ and limit the outward movement of their heads $i$, so as to assure said heads always resting in the apertures $e$. The annulus F surrounds the body C and the inner arms $j$ of the levers D, and is interposed and retained between an exterior abutment $l$ of the body and the retaining-collar G. Said annulus is exteriorly milled or roughened to permit of it being firmly grasped by the hand and is provided at its inner side with four (more or less) walls $m$, disposed at right angles to each other. The outer intermediate portions of these walls $m$ are beveled, as indicated by $n$, and between said walls $m$ are curved walls $p$. In virtue of this construction it will be noticed that when the curved interior walls $p$ of the annulus are opposite the inner arms $j$ of the latch-levers the springs E are enabled to swing the levers to and hold them under pressure in the position shown in Fig. 1. When, however, the annulus is turned axially in either direction from the position shown in Fig. 1, it will be noticed that the interior walls $m$ thereof will act against the inner arms of the levers, and thereby move the levers to the open position shown in Fig. 2. It will also be noticed that when the walls $m$ of the annulus are in engagement with the inner arms of the levers there is no liability of casual rotation of the annulus, and hence no likelihood of the levers casually resuming their closed position, and it will further be observed that the beveled portions $n$ of the walls $m$ rest in engagement with the inner arms of the levers in the position shown in Fig. 1 and are calculated to render easy the movement of the walls $m$ into and out of engagement with the levers.

I prefer to detachably secure the collar G on the body C by screws, as shown, or other means in order that access may be gained to the parts when it is necessary to repair the same.

H is an annular gasket, preferably of rubber, seated in a recess in the inner portion of the abutment $d$ of body C.

In the practical use of my novel coupling it will be seen that when it is desired to connect the members A B it is simply necessary to bring the same forcibly together, so that the head $a$ of member A enters the outer end of member B. When this is done, the head $a$ will ride past the latch-heads $i$, pressing the latter outwardly, and will bring up against the abutment $d$, while the said latch-heads will spring into the circumferential groove $c$. Also the projection $b$ on member A will be embedded in the gasket H, thereby breaking joints and precluding leakage between the members. This sinking of the projection $b$ in the gasket H is assisted by the inclined sides $c'$ of the latch-heads $i$ engaging the correspondingly-inclined wall $c^2$ of the groove $c$ when the latch-heads are forced into said groove by the action of the springs E.

While the members A B may be quickly and easily connected by simply moving one rectilinearly into engagement with the other in the manner described, it will be noticed that the connection is such that there is no liability of the members becoming casually disconnected. It will also be noticed that when in engagement with the member A the heads of the levers D rest in the apertures $e$ of member B, with their ends abutting against the outer walls of said apertures. This is advantageous, since the strain of longitudinal pull on the levers is taken off the pintles of the levers and exerted on the member B.

To effect the disengagement of the members A B, so as to permit of them being readily pulled apart, it is simply necessary to turn the annulus by hand from the position shown in Fig. 1 to the position shown in Fig. 2, when, as before described, the cam-walls $m$ of the annulus will operate to rock the levers into the positions shown in Fig. 2.

An important feature of my novel coupling is the fact that notwithstanding the facility with which the members A and B may be connected and disconnected all of the working parts of the female member are located at the outer side of said member, where water cannot reach them, and hence there is no liability of said parts becoming set by freezing or deteriorated by corrosion. The coupling is also advantageous because of its simplicity and the fact that it embodies no delicate parts, such as are likely to get out of order after a short period of use.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. In a hose-coupling, a male member having a beveled head; in combination with a female member comprising a tubular body, latch-levers fulcrumed at the outer side of the body, and having beveled heads for engaging the head of the male member, means for normally holding the latch-levers in position to engage the head of the male member, and a rotatable annulus surrounding the latch-levers, and having cams arranged to engage the said levers and disengage the same from the head of the male member.

2. In a hose-coupling, a male member having a beveled head, and a circumferential groove at the inner side of said head; in combination with a female member comprising a tubular body adapted to receive the outer portion of the male member, and having an interior abutment for the head of the same, and also having radial apertures in the wall of its outer portion, latch-levers fulcrumed at intermediate points of their length at the outer side of the body, and having beveled heads on their outer arms arranged to extend through the apertures of the body, and engage the head of the male member, one or more springs interposed between the body and the inner arms of the latch-levers, and a rotatable annulus held on the body, around the inner arms of the levers, and having interior cams arranged to engage said arms.

3. In a hose-coupling, a male member having a beveled head, and a circumferential groove at the inner side of said head; in combination with a female member comprising a tubular body adapted to receive the outer portion of the male member, and having an interior abutment for the head of the same, and also having radial apertures in the wall of its outer portion, and exterior, longitudinally-disposed recesses communicating with and extending inwardly from said apertures, latch-levers fulcrumed at intermediate points of their length in said exterior recesses, and having beveled heads on their outer arms arranged to extend through the apertures of the body, and engage the head of the male member, one or more springs interposed between the body and the inner arms of the latch-levers, and a rotatable annulus held on the body around the inner arms of the levers, and having interior walls $m$ disposed at an angle to each other, bevels on said walls, and circular walls between the walls $m$.

4. In a hose-coupling, a male member having a beveled head, a circumferential groove at the inner side of said head, and a forward projection on the outer side of the head; in combination with a female member comprising a tubular body having an interior abutment, and radial apertures in the wall of its center portion, latch-levers fulcrumed at the outer side of the body, and having beveled heads on their outer arms, one or more springs interposed between the body and the inner arms of the levers, a rotatable annulus surrounding the inner arms of the levers and having interior cams arranged to engage the same, and a gasket seated in the interior abutment of the body and arranged to engage the head of the male member, and receive the forward projection thereon.

In testimony whereof I have hereunto set my hand in presence of two subscribing witnesses.

AUGUST HENRY GETZ.

Witnesses:
  MADELEINE GETZ,
  J. H. VIERBUCHEN.